US010659347B2

(12) United States Patent
Chinthalapati et al.

(10) Patent No.: US 10,659,347 B2
(45) Date of Patent: May 19, 2020

(54) INTEGRATED HETEROGENEOUS SOFTWARE-DEFINED NETWORK

(71) Applicant: Avago Technologies International Sales Pte. Limited, Singapore (SG)

(72) Inventors: Eswara S. P. Chinthalapati, San Jose, CA (US); Nikunj Vaidya, Milpitas, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/413,644

(22) Filed: May 16, 2019

(65) Prior Publication Data
US 2019/0268261 A1 Aug. 29, 2019

Related U.S. Application Data

(63) Continuation of application No. 15/678,956, filed on Aug. 16, 2017, now Pat. No. 10,341,226, which is a
(Continued)

(51) Int. Cl.
*G06F 15/173* (2006.01)
*H04L 12/707* (2013.01)
(Continued)

(52) U.S. Cl.
CPC ............. *H04L 45/24* (2013.01); *H04L 45/52* (2013.01); *H04L 45/64* (2013.01); *H04L 45/38* (2013.01)

(58) Field of Classification Search
CPC ......... H04L 45/24; H04L 45/38; H04L 45/52; H04L 45/64
(Continued)

(56) References Cited

U.S. PATENT DOCUMENTS 7,843,906 B1   11/2010   Chidambaram et al.
8,467,375 B2    6/2013   Blair
(Continued)

FOREIGN PATENT DOCUMENTS

CN    101064682 A    10/2007
CN    101548511 A     9/2009

OTHER PUBLICATIONS

Nick McKeown et al., "OpenFlow: Enabling Innovation in Campus Networks", Mar. 14, 2008, pp. 1-6, Retrieved from the Internet: https://www.net.t-labs.tu-berlin.de/teaching/ss09/IR_seminar/papers/openflow-wp-latest.pdf [retrieved Jun. 19, 2018].
(Continued)

*Primary Examiner* — Karen C Tang
(74) *Attorney, Agent, or Firm* — Xsensus LLP

(57) ABSTRACT

One embodiment of the present invention provides a switch in a software-defined network. The switch includes at least one port, a flow management module, and forwarding circuitry. The port is capable of receiving a frame belonging to a software-defined data flow and a frame belonging to a regular data flow. The flow management module logically partitions the port for the frame belonging to the software-defined data flow from the frame belonging to the regular data flow. The forwarding circuitry forwards the frame belonging to the software-defined data flow based on a flow definition in a local flow table. The flow definition indicates how the software-defined data flow is processed in a software-defined network.

20 Claims, 7 Drawing Sheets

Related U.S. Application Data continuation of application No. 13/851,026, filed on Mar. 26, 2013, now Pat. No. 9,769,061.

(60) Provisional application No. 61/785,625, filed on Mar. 14, 2013, provisional application No. 61/650,945, filed on May 23, 2012.

(51) Int. Cl.
*H04L 12/781* (2013.01)
*H04L 12/715* (2013.01)
*G06F 15/16* (2006.01)
*H04L 12/721* (2013.01)

(58) Field of Classification Search
USPC .................................................. 709/217, 224
See application file for complete search history.

(56) References Cited

U.S. PATENT DOCUMENTS

| | | |
|---|---|---|
| 2004/0156313 A1 | 8/2004 | Hofmeister et al. |
| 2008/0112400 A1 | 5/2008 | Dunbar et al. |
| 2009/0316721 A1 | 12/2009 | Kanda |
| 2012/0113989 A1 | 5/2012 | Akiyoshi |
| 2012/0150805 A1 | 6/2012 | Pafumi et al. |
| 2012/0158930 A1* | 6/2012 | Kalusivalingam ...... H04L 45/00 709/223 |
| 2012/0158942 A1 | 6/2012 | Kalusivalingam et al. |
| 2012/0287939 A1 | 11/2012 | Leu et al. |
| 2013/0028256 A1 | 1/2013 | Koren et al. |
| 2013/0173810 A1 | 7/2013 | Subramaniam |
| 2013/0191548 A1 | 7/2013 | Boddukuri et al. |
| 2013/0254321 A1 | 9/2013 | Johnsen et al. |
| 2013/0272135 A1* | 10/2013 | Leong ................. H04L 41/0823 370/241 |
| 2013/0308462 A1 | 11/2013 | Ashida et al. |
| 2014/0372801 A1 | 12/2014 | Graham et al. |
| 2019/0281088 A1* | 9/2019 | Porras ................... H04L 63/107 |

OTHER PUBLICATIONS

Yang Yu et al., "A framework of using OpenFlow to handle transient link failure", TMEE 2011 International Conference on, IEEE, Dec. 16, 2011, pp. 2050-2053.

\* cited by examiner

INTEGRATED HETEROGENEOUS SOFTWARE-DEFINED NETWORK

CROSS-REFERENCE TO RELATED APPLICATIONS

This application is a continuation of U.S. application Ser. No. 15/678,956, filed 16 Aug. 2017, which is a continuation of U.S. application Ser. No. 13/851,026, filed 26 Mar. 2013 (now U.S. Pat. No. 9,769,061), which claims the benefit of U.S. Provisional Application No. 61/785,625, filed 14 Mar. 2013, and U.S. Provisional Application No. 61/650,945, filed 23 May 2012, the entire contents of each are incorporated herein by reference. The present disclosure is also related to U.S. patent application Ser. No. 13/669,313, filed 5 Nov. 2012, the disclosure of which is incorporated by reference herein.

BACKGROUND

Field

The present disclosure relates to network management. More specifically, the present disclosure relates to a method and system for facilitating an efficient integration between a software-defined network and a legacy network.

Related Art

The exponential growth of the Internet has made it a popular delivery medium for heterogeneous data flows. Such heterogeneity has caused an increasing demand for bandwidth. As a result, equipment vendors race to build larger and faster switches with versatile capabilities, such as defining data flows using software, to move more traffic efficiently. However, the complexity of a switch cannot grow infinitely. It is limited by physical space, power consumption, and design complexity, to name a few factors. Furthermore, switches with higher and more versatile capability are usually more complex and expensive.

Software-defined flow is a new paradigm in data communication networks. Any network supporting software-defined flows can be referred to as software-defined network. An example of a software-defined network can be an OpenFlow network, wherein a network administrator can configure how a switch behaves based on flow definitions that can be defined across different layers of network protocols. A software-defined network separates the intelligence needed for controlling individual network devices (e.g., routers and switches) and offloads the control mechanism to a remote controller device (often a standalone server or end device). Therefore, a software-defined network provides complete control and flexibility in managing data flow in the network.

While support for software-defined flows brings many desirable features to networks, some issues remain unsolved in facilitating integrated provisioning and management of data flows in a heterogeneous software-defined network.

SUMMARY

One embodiment of the present invention provides a switch in a software-defined network. The switch includes at least one port, a flow management module, and forwarding circuitry. The port is capable of receiving a frame belonging to a software-defined data flow and a frame belonging to a regular data flow. The flow management module logically partitions the port for the frame belonging to the software-defined data flow from the frame belonging to the regular data flow. The forwarding circuitry forwards the frame belonging to the software-defined data flow based on a flow definition in a local flow table. The flow definition indicates how the software-defined data flow is processed in a software-defined network.

In a variation on this embodiment, the forwarding circuitry forwards the frame belonging to the regular data flow based on a local forwarding table.

In a variation on this embodiment, the software-defined network is an OpenFlow-enabled network.

In a variation on this embodiment, the flow management module logically partitions the port based on one or more of: a virtual local area network (VLAN) tag or identifier, a type of a frame, and a flag in a header of a received frame.

In a variation on this embodiment, the flow management module divides bandwidth of the port into a plurality of logical partitions. Among the logical partitions, at least one logical partition is allocated for the software-defined data flow.

One embodiment of the present invention provides a switch in a software-defined network. The switch includes forwarding circuitry and an arbitration management module. During operation, the forwarding circuitry processes a frame belonging a software-defined data flow based on one or more of: forwarding information in a forwarding table and a flow definition in a local flow table. The flow definition indicates how the software-defined data flow is processed in a software-defined network. The arbitration management module applies an arbitration policy on the frame. The arbitration policy dictates whether and at which order the switch uses the flow table, forwarding table, or both for processing the frame.

In a variation on this embodiment, the forwarding information includes one or more of: layer-2 forwarding information and layer-3 routing and forwarding information.

In a variation on this embodiment, the arbitration policy is based on a priority associated with the software-defined data flow. The value of the priority dictates the order at which the switch uses the flow table, forwarding table, or both for processing the frame.

In a variation on this embodiment, the software-defined network is an OpenFlow-enabled network.

In a variation on this embodiment, the switch also includes a flow management module, which uses the software-defined data flow for providing one or more of: backup forwarding, policy based routing, network management; and service. The service includes one or more of: firewall, load balancing, network access control, intrusion detection/protection, network analysis, and network virtualization.

In a variation on this embodiment, the switch also includes an information management module, which facilitates polling for network state information to a controller of the software-defined network. The network state information includes one or more of: topology discovery information, traffic statistics, and link status information.

BRIEF DESCRIPTION OF THE FIGURES

In the figures, like reference numerals refer to the same figure elements.

DETAILED DESCRIPTION

Figure 1A:
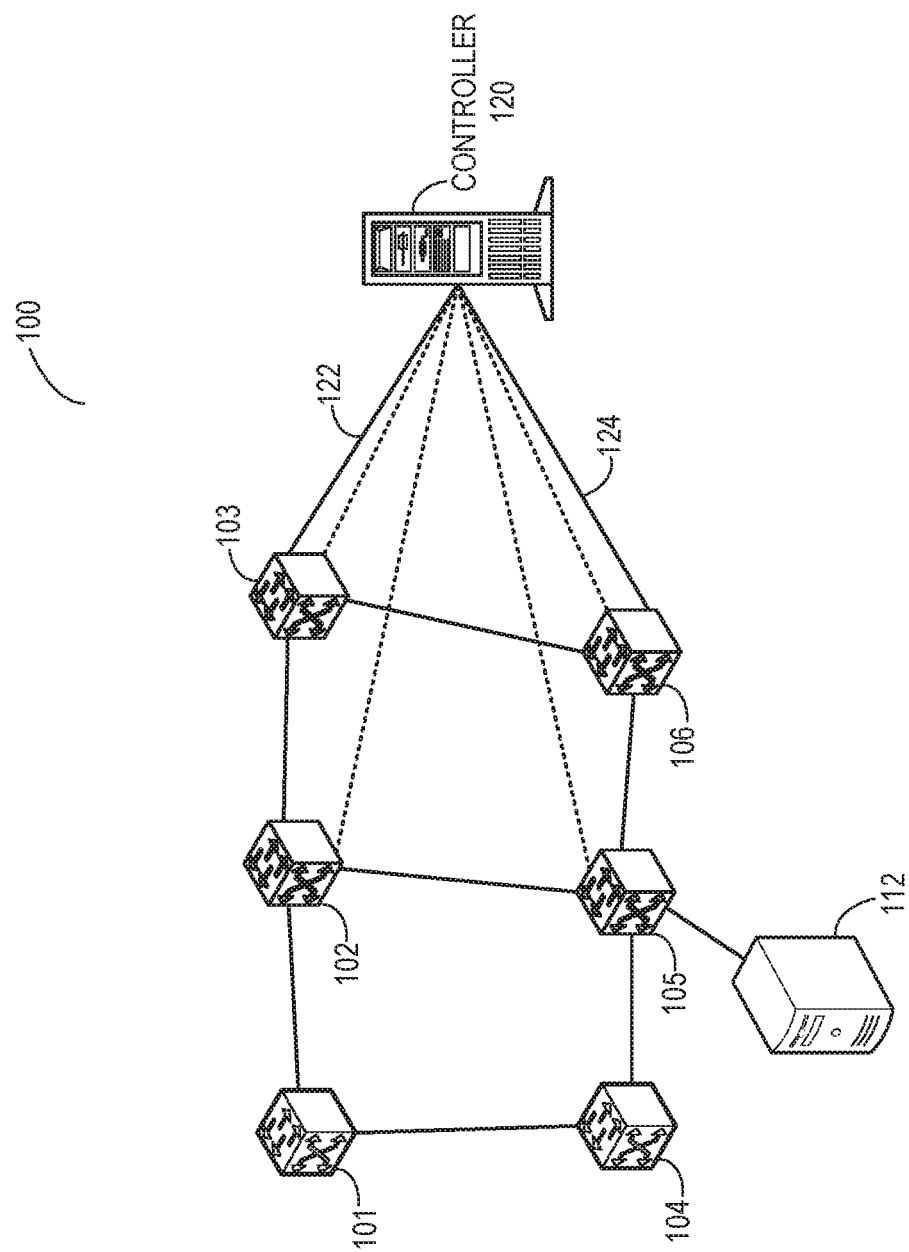
FIG. 1A illustrates an exemplary integrated heterogeneous software-defined network, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of integrating a software-defined network architecture with a legacy network architecture is solved by: (1) using the same port to process a software-defined flow and a regular flow (i.e., a non-software-defined flow) by logically partitioning the port for the flows; and (2) using native forwarding table in addition to the flow table for software-defined flows.

A controller, which is usually a standalone device, provides the forwarding intelligence (i.e., the control plane) in a software-defined network by generating flow definitions (such as those defined using OpenFlow) comprising rules and corresponding actions. The switches in the software-defined network are typically passive entities operating based on the flow definitions. Because software-defined flows redefine traditional dataflow management, coexistence of software-defined flow with current network architecture can be challenging. With the existing technologies, a switch often only supports either software-defined flow or regular flow. Some switches are partitioned into two logical partitions for supporting regular and software-defined flows. As a result, data traffic belonging to a software-defined flow can be processed only by the logical partition associated with software-defined flows. Furthermore, the native forwarding table in a switch is not used for making forwarding decisions for software-defined flows. Consequently, when the switch receives a frame of a software-defined flow which does not have a corresponding flow definition, the switch drops the frame even when the native forwarding table includes forwarding information for the frame.

The solutions described herein to the above problem are twofold. First, in a software-defined network, a hybrid software-definable switch, which is capable of processing both software-defined and regular flows received via the same port, can logically partition the port for the flows. Based on the logical partition, the switch uses the flow table or the forwarding table for processing a respective frame, thereby supports both software-defined and regular flows without partitioning the switch. Second, the switch can use flow table, forwarding table, or both for processing a frame of a software-defined flow. The switch applies an arbitration policy to the frame. This arbitration policy dictates whether and at which order the switch uses the flow table, forwarding table, or both for processing the frame. In this way, the switch can use the forwarding information available in a forwarding table in addition to the flow definitions in the flow table for a more efficient forwarding.

In this disclosure, the term "software-defined network" refers to a network that facilitates control over a respective data flow by specifying the action associated with the flow in a flow definition. A controller, which can be a server, coupled to the software-defined network provides a respective switch in the software-defined network with the flow definitions. A flow definition can include a priority value, a rule that specifies a flow, and an action (e.g., a forwarding port or "drop") for the flow. The rule of a flow definition can specify, for example, any value combination in the ten-tuple of {in-port, virtual local area network (VLAN) identifier, media access control (MAC) source and destination addresses, Ethertype, Internet Protocol (IP) source and destination addresses, Internet Protocol, Transmission Control Protocol (TCP) source and destination ports}. Other packet header fields can also be included in the flow rule. Depending on its specificity, a flow rule can correspond to one or more flows in the network. Upon matching a respective packet to a rule, the switch in the software-defined network takes the action included in the corresponding flow definition. An example of a software-defined network includes, but is not limited to, OpenFlow, as described in Open Networking Foundation (ONF) specification "OpenFlow Switch Specification," available at http://www.openflow.org/documents/openflow-spec-v1.1.0.pdf, which is incorporated by reference herein.

In this disclosure, a switch in a software-defined network and capable of processing software-defined flows is referred to as a "software-definable" switch. Such a software-definable switch can include ports that can process software-defined flows and conventional packet forwarding (e.g., layer-2/Ethernet switching, or IP routing), which is referred to as "regular flows" in this disclosure. A flow definition typically includes one or more software-definable in-ports to which the definition is applicable.

In some embodiments, the software-defined network is a fabric switch and a respective switch in the software-defined network is a member switch of the fabric switch. The fabric switch can be an Ethernet fabric switch. In an Ethernet fabric switch, any number of switches coupled in an arbitrary topology may logically operate as a single switch. Any new switch may join or leave the fabric switch in "plug-andplay" mode without any manual configuration. A fabric switch appears as a single logical switch to the end device.

Although the present disclosure is presented using examples based on OpenFlow, embodiments of the present invention are not limited to networks defined using OpenFlow or a particular Open System Interconnection Reference Model (OSI reference model) layer. In this disclosure, the term "software-defined network" is used in a generic sense, and can refer to any network which facilitates switching of data flows based on software-defined rules. The term "flow definition" is also used in a generic sense, and can refer to any rule which identifies a data frame belonging to a specific flow and/or dictates how a switch should process the frame.

The term "end device" can refer to a host, a conventional layer-2 switch, or any other type of network device. Additionally, an end device can be coupled to other switches or hosts further away from a network. An end device can also be an aggregation point for a number of network devices to enter the network.

The term "message" refers to a group of bits that can be transported together across a network. "Message" should not be interpreted as limiting embodiments of the present invention to any specific networking layer. "Message" can be replaced by other terminologies referring to a group of bits, such as "frame," "packet," "cell," or "datagram." The term "frame" is used in a generic sense and should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an end device can be referred to as a "switch." Examples of a "switch" include, but are not limited to, a layer-2 switch, a layer-3 router, a Transparent Interconnection of Lots of Links (TRILL) Routing Bridge (RBridge), an FC router, or an FC switch.

The term "service" is used in a generic sense, and can refer to any operation or group of operations providing specific functionality to a standalone or fabric switch operating in any network layer. Any functionality required by a switch can be referred to as a "service."

The term "Ethernet fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary integrated heterogeneous software-defined network, in accordance with an embodiment of the present invention. A heterogeneous software-defined network 100 includes regular switches 101 and 104. Also included are hybrid software-definable switches 102, 103, 105, and 106, which are capable of processing both software-defined and regular flows. Controller 120 is logically coupled to a respective software-definable switch in network 100. Note that controller 120 can be physically coupled to only a subset of the switches. In this example, controller 120 is coupled to switches 103 and 106 via physical links 122 and 124, respectively. End device 112 is coupled to network 100 via software-definable switch 105.

Software-definable switch 102 includes one or more hybrid ports. Switch 102 uses its hybrid ports to control (e.g., forwarding, applying a policy, traffic dropping, etc.) the frames of software-definable flows. Furthermore, switch 102 uses the hybrid ports to receive and forward the frames of regular flows as well. Similarly, software-definable switches 103, 105, and 106 also use their respective hybrid port to process data traffic of both software-definable and regular flows. Switch 102 also includes regular ports which only process regular flows. During operation, controller 120 sends flow definitions to switches 102, 103, 104, and 105. Upon receiving a flow definition, switches 102, 103, 104, and 105 use a data structure (e.g., a linked-list) to store the flow definition. In hardware (e.g., in Content Addressable Memory (CAM)), the flow definition is typically stored based on the respective priority of the flow definition.

In some embodiments, if switch 102 receives a frame of a regular flow via a hybrid port, switch 102 forwards the traffic using the forwarding table in switch 102. On the other hand, if switch 102 receives a frame of a software-defined flow via the same port, switch 102 controls the traffic based on the flow definitions in switch 102. In this way, switch 102 uses the same physical port for processing frames belonging to both software-defined and regular flows. Similarly, switches 103, 105, and 106 use the same physical port for processing frames belonging to both software-defined and regular flows. In this way, switches 102, 103, 105, and 106 support both software-defined without logically partitioning these switches.

Figure 1B:
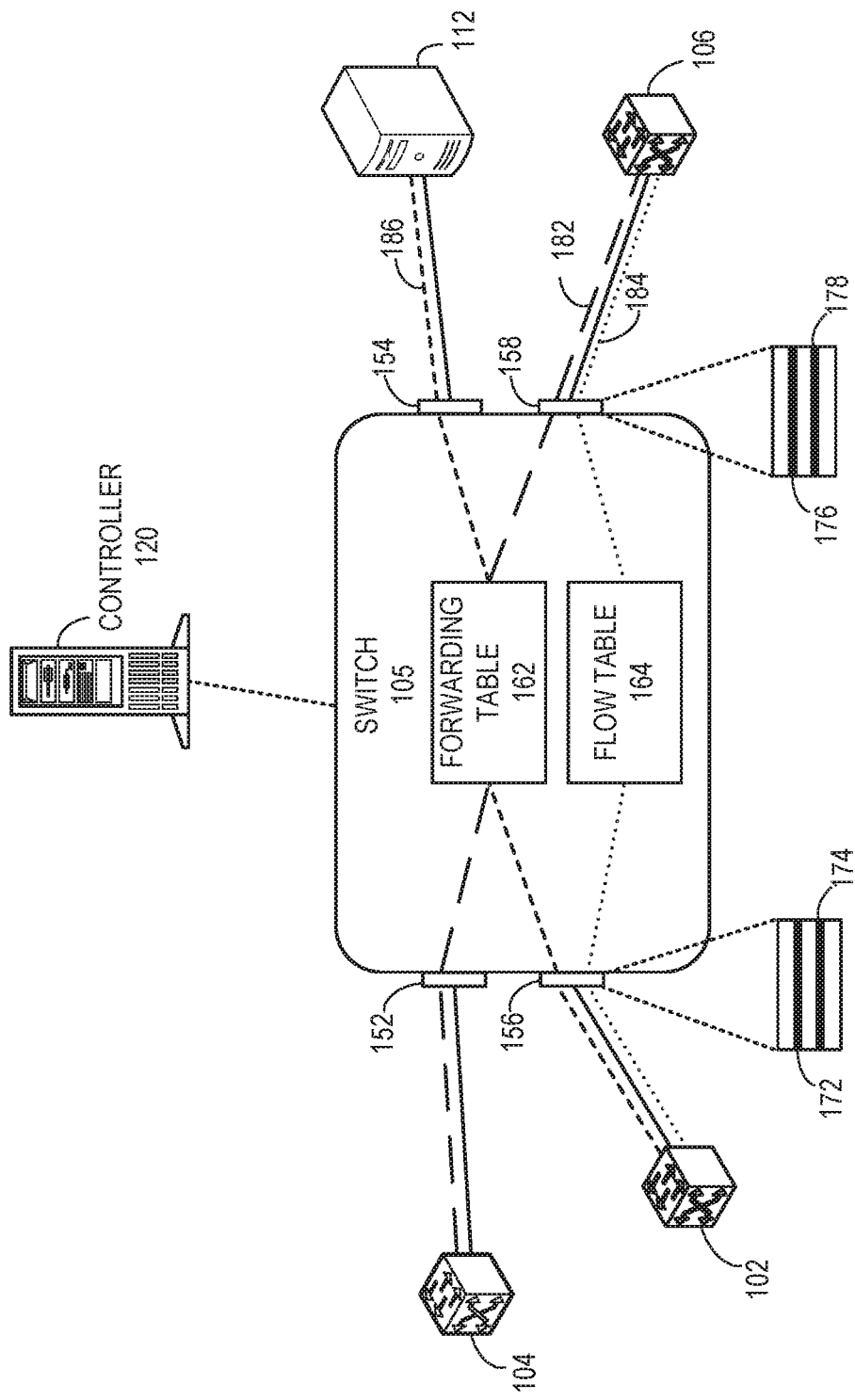
FIG. 1B illustrates exemplary logical partitioning of hybrid ports in a hybrid software-definable switch in conjunction with the example in FIG. 1A, in accordance with an embodiment of the present invention.

FIG. 1B illustrates exemplary logical partitioning of hybrid ports in a hybrid software-definable switch in conjunction with the example in FIG. 1A, in accordance with an embodiment of the present invention. In this example, hybrid software-definable switch 105 includes regular ports 152 and 154, and hybrid ports 156 and 158. When switch 105 receives a flow definition from controller 120, switch 105 stores the flow definition in flow table 164. Flow table 164 can be a data structure (e.g., a linked-list), a hardware module (e.g., a CAM), or both. Hybrid port 156 is divided into two logical partitions 172 and 174 for software-defined and regular flows, respectively. Hybrid port 156 can be divided into logical partitions based on one or more of: a VLAN tag or identifier, frame type, flag in a header, and any other distinguishable feature in a frame.

Similarly, hybrid port 158 is also divided into two logical partitions 176 and 178 for software-defined and regular flows, respectively. In some embodiments, hybrid ports 156 and 158 can be divided into a plurality of logical partitions. Dividing a port into a plurality of logical partitions is specified in U.S. Patent Publication No. 2009/0316721, titled "Method and System for Facilitating Application-Oriented Quality of Service in a Fibre Channel Network," the disclosure of which is incorporated herein in its entirety.

In some embodiments, switch 105 dedicates logical partitions 172 and 176 for a VLAN 184, which is associated with the software-defined flows in network 100. During operation, switch 105 receives a frame belonging to VLAN 184. Consequently, switch 105 identifies the received frame as part of a software-defined flow and controls the frame based on the flow definitions in flow table 164. For example, when switch 105 receives a frame via port 156, switch 105 identifies a tag associated with VLAN 184 in the frame and recognizes the frame to be part of a software-defined flow. As a result, switch 105 uses the flow definitions in flow table 164 to forward the frame to switch 106.

On the other hand, switch 105 dedicates logical partitions 174 and 178 for all VLANs other than VLAN 184, such as VLAN 182 and 186, in network 100. When switch 105 receives a frame belonging to VLAN 186 via port 156, switch 105 identifies a tag associated with VLAN 186 in the frame. Because the VLAN tag in the frame does not correspond to VLAN 184, switch 105 considers the frame to be the part of a regular flow. As a result, switch 105 uses forwarding table 162 to forward the frame to end device 112. Similarly, when switch 105 receives a frame belonging to VLAN 182 via port 158, switch 105 identifies a tag associated with VLAN 182 in the frame and recognizes the frame to be part of a regular flow. As a result, switch 105 uses forwarding table 162 to forward the frame to switch 104.

Frame Processing

Figure 2:
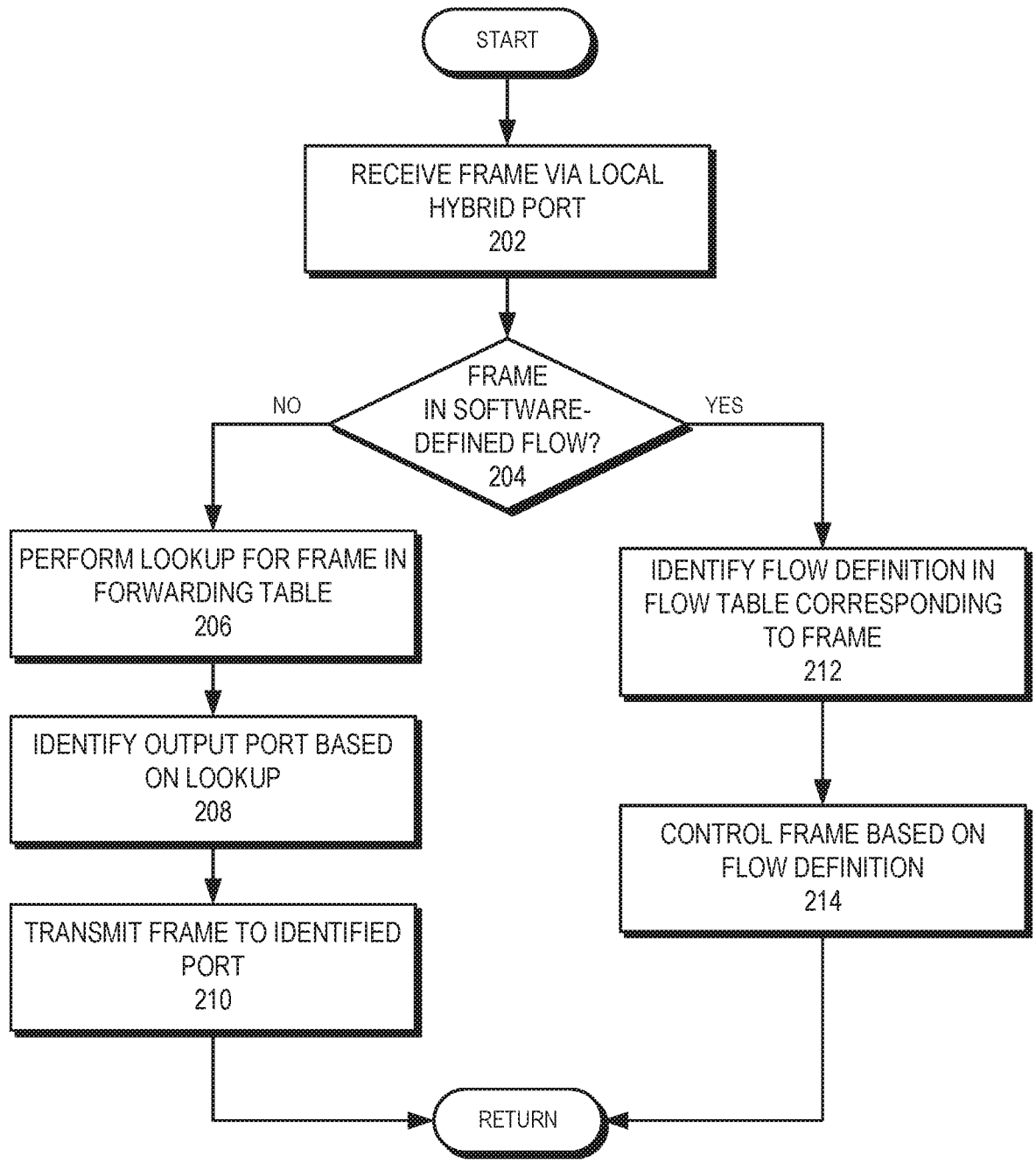
FIG. 2 presents a flowchart illustrating the process of a hybrid software-definable switch forwarding data received via logically partitioned hybrid ports, in accordance with an embodiment of the present invention.

In the example in FIG. 1B, switch 105 forwards a respective data frame received via a hybrid port based on whether the frame belongs to a software-defined flow. FIG. 2 presents a flowchart illustrating the process of a hybrid software-definable switch forwarding data received via logically partitioned hybrid ports, in accordance with an embodiment of the present invention. During operation, the switch receives a frame via a local hybrid port (operation 202). The switch then checks whether the frame belongs to a software-defined flow (operation 204). In some embodiments, the switch checks one or more of: a VLAN tag or identifier, frame type, and flag in a header in the received frame to decide whether the frame belongs to a software-defined flow.

If the frame belongs to a software-defined flow, the switch identifies a flow definition in the flow table corresponding to the frame (operation 212). The switch then controls the frame based on the flow definition (operation 214). Controlling the frame includes transmitting the frame to the port specified by the identified flow. Controlling the frame further includes dropping the frame when specified by the identified flow definition or when the switch does not find any flow definition corresponding to the frame. In this way, a controller can provide services (e.g., a firewall service by specifying which flows to drop) via the switch.

If the frame does not belong to a software-defined flow (i.e., belongs to a regular flow), the switch performs a lookup for the frame in the native forwarding table (operation 206). This forwarding table can be a layer-2 switching table, a forwarding information base (FIB), a routing information base (RIB), or a combination of them. If the switch is a layer-2 device, the forwarding table can be populated by learning MAC addresses. On the other hand, if the switch is a layer-3 device, the forwarding table can be populated by running a routing protocol. After the lookup, the switch identifies the output port based on the lookup (operation 208). In some embodiments, the switch is a member of a fabric switch, wherein the switch can also identify a next-hop member switch of the fabric switch based on the lookup. The switch then transmits the frame to the identified port (operation 210). In this way, the switch can use the same hybrid port to process a frame which can belong either to a regular flow or a software-defined flow.

Integrated Lookup

Figure 3A:
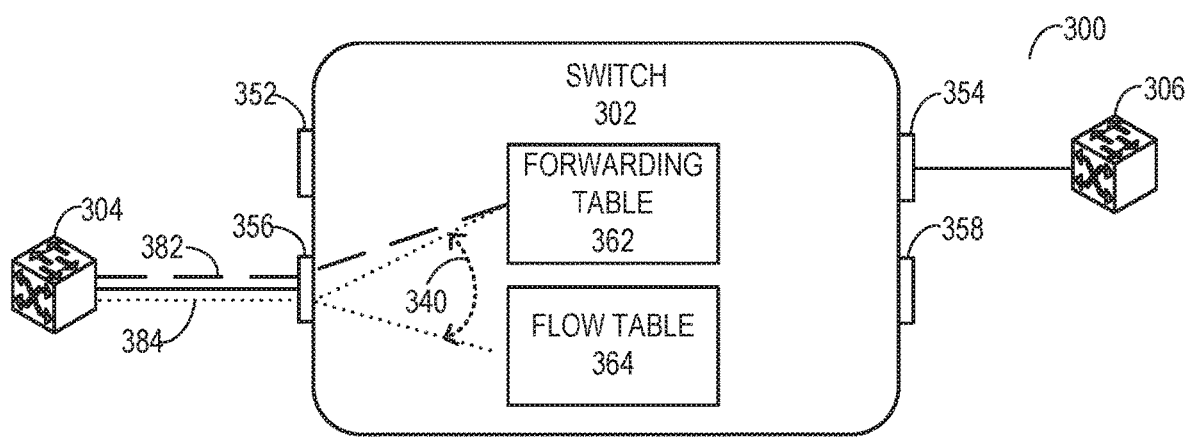
FIG. 3A illustrates an exemplary hybrid software-definable switch with integrated lookup capability, in accordance with an embodiment of the present invention.

In the example in FIG. 1B, switch 105 cannot use native forwarding table 162 for making forwarding decision for software-defined flows. Consequently, switch 105 may drop a frame of a software-defined flow without any corresponding flow definition in flow table 164 even when forwarding table 162 includes forwarding information for the frame. To solve this problem, switch 105 can implement an integrated use of flow table 164 and forwarding table 162 for processing a software-defined flow. FIG. 3A illustrates an exemplary hybrid software-definable switch with integrated lookup capability, in accordance with an embodiment of the present invention. A heterogeneous software-defined network 300 includes hybrid software-definable switches 302, 304, and 306, which are capable of processing both software-defined and regular flows. A respective software-definable switch in network 300 is logically coupled to a controller.

In the example in FIG. 3A, when switch 302 receives a flow definition from the controller, switch 302 stores the flow definition in flow table 364. Flow table 364 can be a data structure (e.g., a linked-list), a hardware module (e.g., a CAM), or both. Switch 302 also includes a forwarding table 362, which can be a layer-2 switching table, an FIB, an RIB, or a combination of them. Switch 302 includes regular ports 352 and 354 and hybrid ports 356 and 358, which can receive data traffic belonging to both software-defined and regular flows without any partitioning. Switch 302 implements an integrated lookup of flow table 364 and forwarding table 362. In an integrated lookup, switch 302 can use flow table 364, forwarding table 362, or both for making a forwarding decision for a frame of a software-defined flow.

In network 300, a VLAN 384 is associated with the software-defined flows. On the other hand, all VLANs other than VLAN 384, such as VLAN 382, in network 300 are associated with regular traffic. During operation, switch 302 receives a frame belonging to VLAN 382 from switch 302 via port 356 and identifies a tag associated with VLAN 382 in the frame. Because the VLAN tag in the frame does not correspond to VLAN 384, switch 302 considers the frame to be the part of a regular flow. As a result, switch 302 uses native forwarding table 362 to forward the frame.

On the other hand, if switch 302 receives a frame via port 356 with a tag associated with VLAN 384 in the frame, switch 302 recognizes the frame to be part of a software-defined flow. Switch 302 then applies an arbitration policy 340, which dictates whether and at which order switch 302 uses flow table 364, forwarding table 362, or both for processing the frame. In some embodiments, arbitration policy specifies a priority value indicating the order. For example, suppose that forwarding table 362 specifies the regular forwarding of a flow associated with VLAN 384 and a flow definition in flow table 364 specifies the backup forwarding (i.e., forwarding via a backup path) for the flow. Arbitration policy 340 specifies that, for that specific flow, forwarding table 362 has a better priority (which can be either higher or lower) than flow table 364. In this way, switch 302 can use the forwarding information available in forwarding table 362 first and then flow table 364 for controlling a frame of the flow.

Figure 3B:
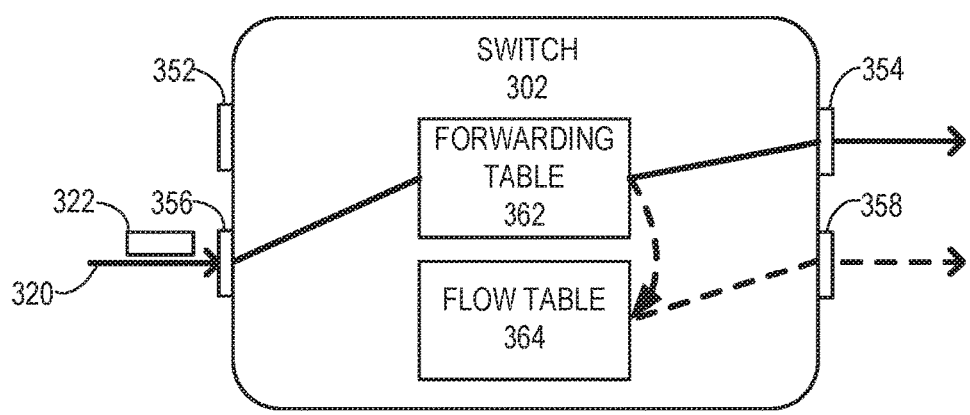
FIG. 3B illustrates an exemplary integrated lookup with a better priority associated with the forwarding table in conjunction with the example in FIG. 3A, in accordance with an embodiment of the present invention.

FIG. 3B illustrates an exemplary integrated lookup with a better priority associated with the forwarding table in conjunction with the example in FIG. 3A, in accordance with an embodiment of the present invention. In this example, forwarding table 362 specifies the regular forwarding of a software-defined flow 320 and a flow definition in flow table 364 specifies the backup forwarding of flow 320. In some embodiments, a plurality of flow definitions in flow table 364 specify the backup forwarding of flow 320 for providing redundancy. During operation, switch 302 receives a frame 322 of flow 320 via port 356. Switch 302 discovers that forwarding table 362 has a better priority than flow table 364 for flow 320. Hence, switch 302 performs a lookup for frame 322 based on forwarding table 362, identifies port 354 as the output port, and transmits frame 322 via port 354.

However, in a failure scenario where the forwarding path via port 354 is unavailable (e.g., due to a link or node failure associated with switch 306 in FIG. 3A), switch 302 can use the flow definition which specifies the backup forwarding for flow 320 in flow table 364 (denoted using dotted lines). In some embodiments, upon detecting a failure, switch 302 changes the priority associated flow table 364 and assigns a better priority value to flow table 364 than forwarding table 362. In this way, switch 302 can use integrated lookup of flow table 364 in addition to forwarding table 362 for forwarding frame 322. As a result, switch 302 can seamlessly change the provisioning of flow 320 by readily using the backup forwarding for flow 320 without computing a corresponding backup path and waiting for the network to converge.

Figure 3C:
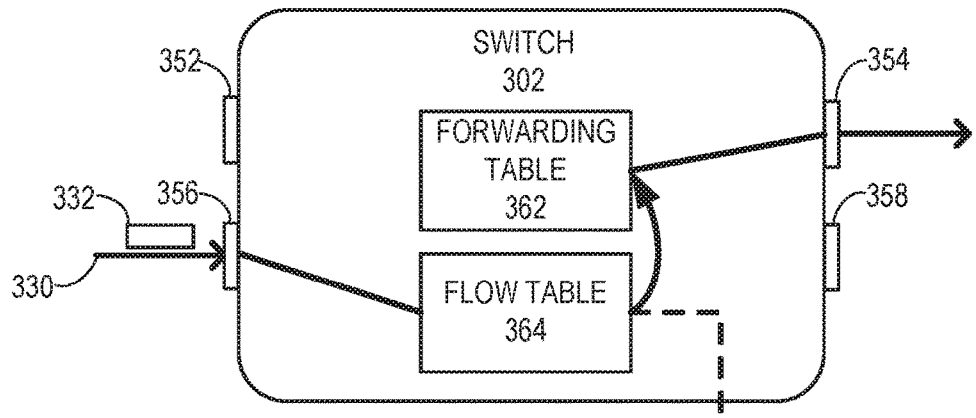
FIG. 3C illustrates an exemplary integrated lookup with a better priority associated with the flow table in conjunction with the example in FIG. 3A, in accordance with an embodiment of the present invention.

FIG. 3C illustrates an exemplary integrated lookup with a better priority associated with the flow table in conjunction with the example in FIG. 3A, in accordance with an embodiment of the present invention. In this example, forwarding table 362 specifies the regular forwarding of a software-defined flow 330 and a flow definition in flow table 364 specifies a service for switch 302. Examples of a service include, but are not limited to, firewall, load balancing, network access control, intrusion detection/protection, network analysis, and network virtualization. In some embodiments, a flow definition in flow table 364 specifies a policy for policy-based forwarding in switch 302. Suppose that in the example in FIG. 3C, one or more flow definitions in flow table 364 specify a firewall service for switch 302. These flow definitions can specify one or more flows which should be dropped by switch 302. Hence, switch 302 needs to process a frame based on flow table 364 before forwarding table 362.

During operation, switch 302 receives a frame 332 of flow 330 via port 356. Switch 302 discovers that flow table 364 has a better priority than forwarding table 362. Hence, switch 302 uses flow table 364 to check whether the one or more flow definitions specifying the firewall service are applicable to frame 332. If frame 332 matches any of the flow definitions specifying the firewall service, switch 302 drops the flow (denoted with dotted line). Otherwise, switch 302 performs a lookup for frame 332 based on forwarding table 362, identifies port 354 as the output port, and transmits frame 332 via port 354.

Figure 4:
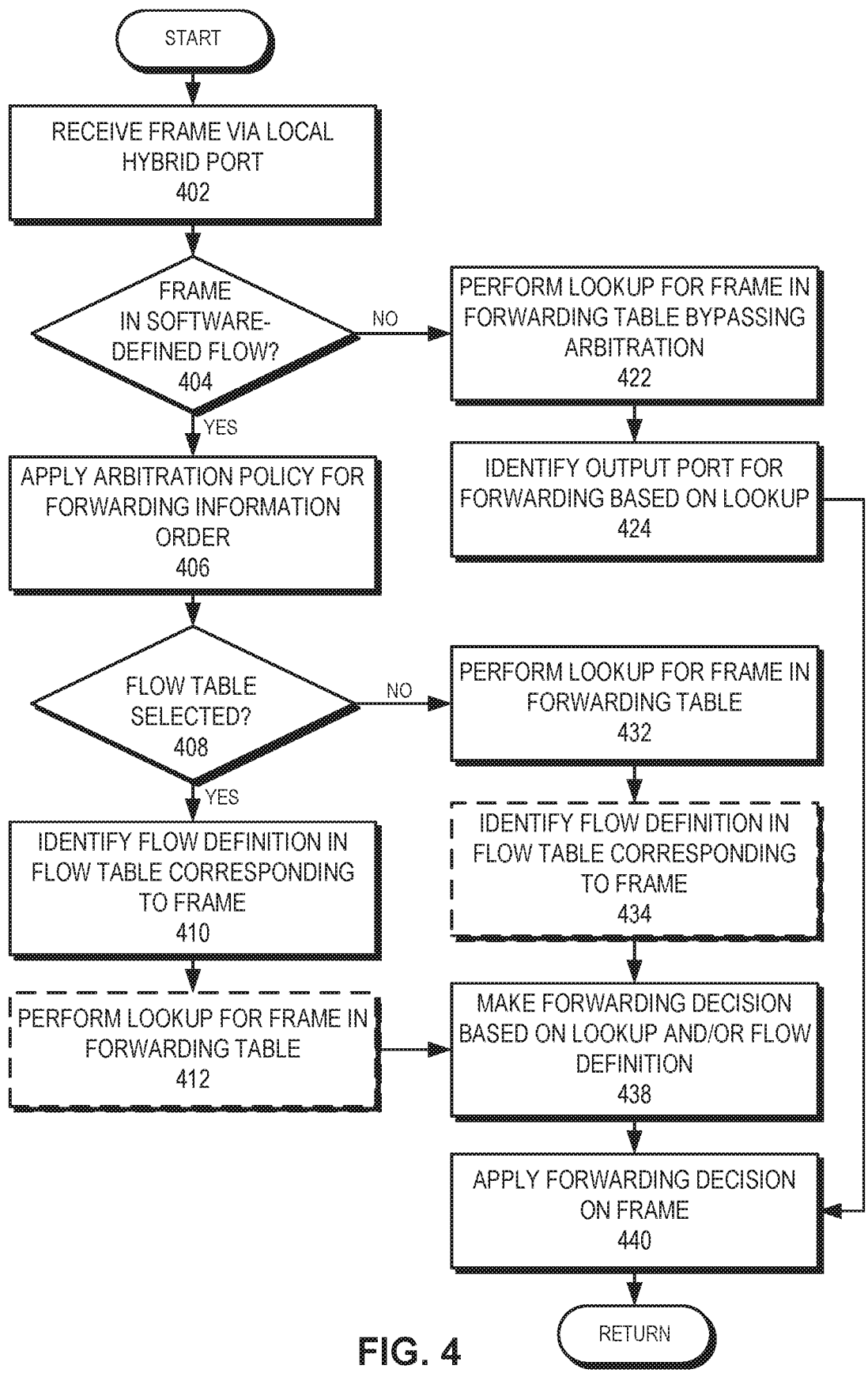
FIG. 4 presents a flowchart illustrating the integrated lookup process of a hybrid software-definable switch based on forwarding and flow tables, in accordance with an embodiment of the present invention.

FIG. 4 presents a flowchart illustrating the integrated lookup process of a hybrid software-definable switch based on forwarding and flow tables, in accordance with an embodiment of the present invention. During operation, the switch receives a data frame via a local hybrid port (operation 402). The switch then checks whether the frame is a software-defined flow (operation 404). In some embodiments, the switch checks one or more of: a VLAN tag or identifier, frame type, and flag in a header in the received frame to decide whether the frame belongs to a software-defined flow. If the frame does not belong to a software-defined flow (i.e., belongs to a regular flow), the switch performs a lookup for the frame in the forwarding table (operation 422) bypassing any arbitration policy, as described in conjunction with FIG. 3A. This forwarding table can be a layer-2 switching table, an FIB, an RIB, or a combination of them. After the lookup, the switch identifies the output port for processing the frame based on the lookup (operation 424). In some embodiments, the switch is a member of a fabric switch, wherein the switch can also identify a next-hop member switch of the fabric switch based on the lookup.

If the frame belongs to a software-defined flow (operation 404), the switch applies an arbitration policy for the forwarding information order for the frame (operation 406). The forwarding information order specifies whether and at which order which the switch uses flow table, forwarding table, or both for processing the frame. In some embodiments, the switch associates a priority value to determine the forwarding information order. The switch then checks whether the arbitration policy has selected the flow table (operation 408). If not (i.e., if the arbitration has selected the forwarding table), the switch performs a lookup for the frame in the forwarding table (operation 432). Based on the arbitration policy, the switch can optionally identify a flow definition in the flow table corresponding to the frame (operation 434), as described in conjunction with FIG. 3B.

If the arbitration policy has selected the flow table, the switch identifies a flow definition in the flow table corresponding to the frame (operation 410). Based on the arbitration policy, the switch can optionally perform a lookup for the frame in the forwarding table (operation 412), as described in conjunction with FIG. 3C. After performing a lookup in forwarding table (operation 412) or identifying a flow definition (operation 434), the switch makes a forwarding decision for the frame based on the lookup and/or the identified flow definition (operation 438). For example, if the switch does not check the flow table (operation 434) after performing a lookup in the forwarding table (operation 432), the switch makes the forwarding decision only based on the lookup. After making the forwarding decision (operation 438) or identifying the output port for forwarding (operation 424), the switch applies the forwarding decision on the frame (operation 440).

Network Management

Figure 5:
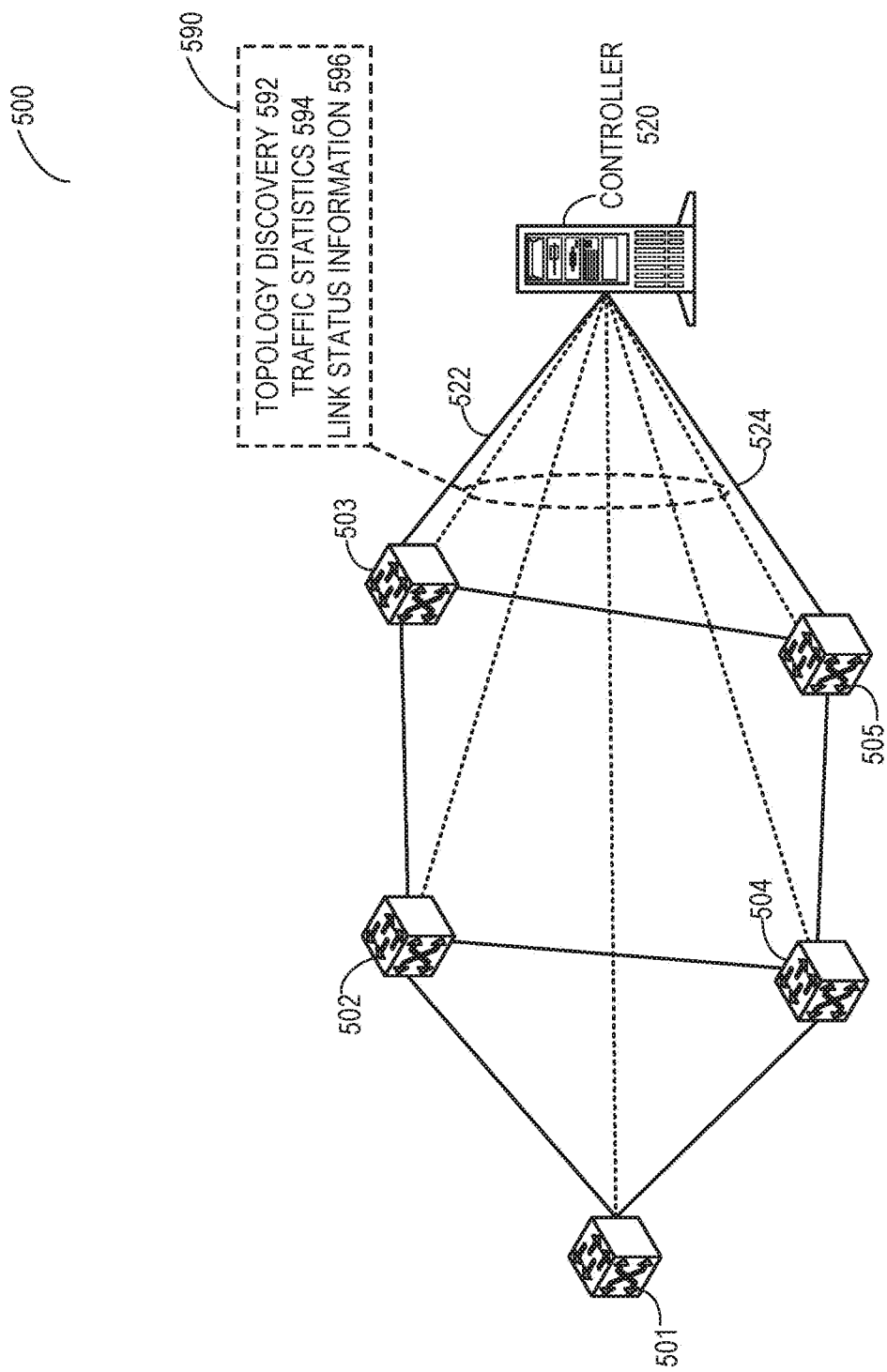
FIG. 5 illustrates an exemplary integrated heterogeneous software-defined network with a controller operating as a network management module, in accordance with an embodiment of the present invention.

In some embodiments, software-defined flows can be used to manage a software-defined network. A controller can poll information from the network and use such data for dynamic provisioning and management. FIG. 5 illustrates an exemplary integrated heterogeneous software-defined network with a controller operating as a network management module, in accordance with an embodiment of the present invention. A software-defined network 500 includes hybrid software-definable switches 501, 502, 503, 504, and 505, which are capable of processing both software-defined and regular flows. Controller 520 is logically coupled to a respective software-definable switch in network 500. Note that controller 520 can be physically coupled to only a subset of the switches. In this example, controller 520 is coupled to switches 503 and 505 via physical links 522 and 524, respectively.

During operation, controller 520 polls switches 501, 502, 503, 504, and 505 to collect network state information 590 of network 500. In some embodiments, controller 520 sends query messages to switches 501, 502, 503, 504, and 505 to initiate information polling from a respective switch in network 500. Upon receiving the query messages, a respective switch in network 500 starts sending network state information 590 to controller 520. In some embodiments, network state information 590 includes topology discovery information 592, traffic statistics 594, and link status information 596.

In some embodiments, a respective switch in network 500 is configured with Simple Network Management Protocol (SNMP) traps, which allow the switch to provide unsolicited information about local link status. Controller 520 can collect link status information 596 by polling these traps. In some embodiments, controller 520 uses a discovery protocol for obtaining topology discovery information 592. An example of the discovery protocol includes, but is not limited to, Link Layer Discovery Protocol (LLDP). A respective switch in network 500 can be configured to send messages comprising topology discovery information 592 to controller 520. In some embodiments, controller 520 collects traffic statistics 594 from a respective switch in network 500.

Controller 520 uses state information 590 to efficiently manage network 500. For example, controller 520 uses collected traffic statistics 594 to compute link loads and balance the link loads throughout network 500. In this way, controller 520 can establish efficient paths for software-defined flows. Furthermore, controller 520 can utilize network state information 590 for redundancy and seamlessly change the provisioning of software-defined flows in network 500, as described in conjunction with FIG. 3B. Based on network state information 590, controller 520 can ensure quality of service for the software-defined flows. Moreover, controller 520 can use software-defined flows to provide services, such as policy-based routing, network access control, security (e.g., intrusion detection and prevention), and firewall. These functionalities can enable controller 520 to operate as a network management module. As a result, when switches 501, 502, 503, 504, and 505 are equipped with the capabilities and functionalities described in conjunction with FIGS. 1B and 3A, controller 520 can facilitate an integrated architecture to support provisioning, data collection, redundancy management, network management, policy based control, and network services.

Exemplary Switch

Figure 6:
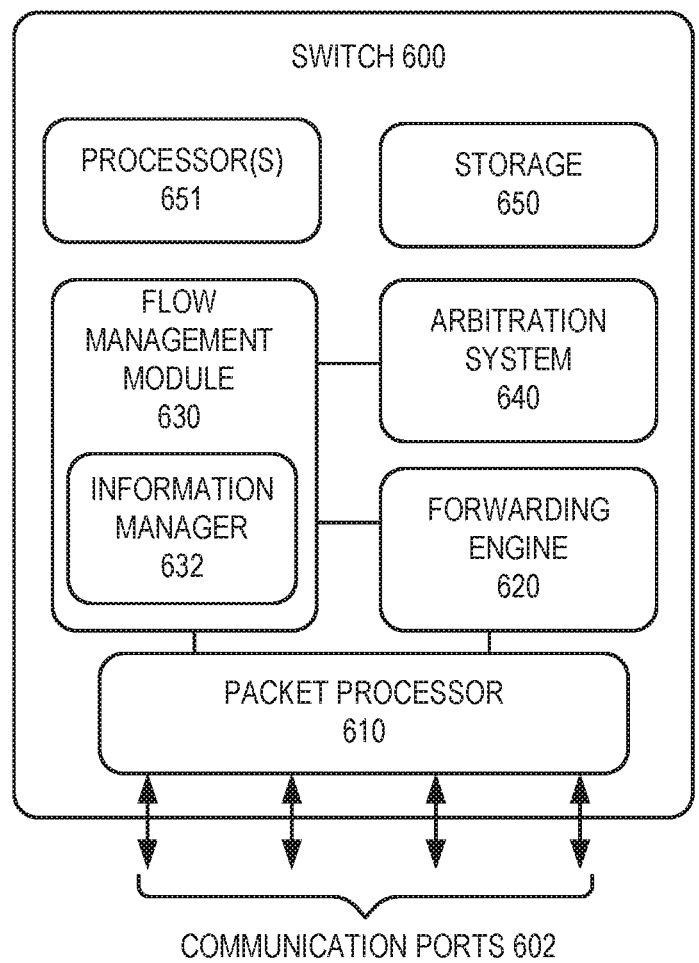
FIG. 6 illustrates an exemplary software-definable switch in an integrated heterogeneous software-defined network, in accordance with an embodiment of the present invention.

FIG. 6 illustrates an exemplary software-definable switch in an integrated heterogeneous software-defined network, in accordance with an embodiment of the present invention. In this example, a switch 600 includes a number of communication ports 602, a forwarding engine 620, a flow management module 630, a packet processor 610, a processor 651, and a storage device 650. At least one of the communications ports 602 is a hybrid port capable of receiving a frame belonging to a software-defined flow and a frame belonging to a regular flow. Switch 600 can have a logical connection with a controller in a software-defined network. In some embodiments, the software-defined network is an OpenFlow-enabled network. Flow management module 630 may be implemented in software, hardware, or a combination thereof. For example, flow management module 630 can be implemented in a set of instructions stored in storage device 650, and when such instructions are executed by processor 651, cause processor 651 to perform a set of operations. Flow management module 630 can also be implemented in hardware chips such as ASICS and FPGAs.

During operation, switch 600 receives a frame via the hybrid port. Flow management module 630 logically partitions the port based on whether the frame belongs to a software-defined flow or regular flow. Flow management module 630 can logically partition the port based on one or more of: a VLAN identifier in the frame, the type of the frame, and a flag in a header of the frame. If the frame belongs to the software-defined flow, forwarding engine 620, which can include circuitry for forwarding frames, forwards the frame based on a flow definition in a local flow table. On the other hand, if the frame belongs to the regular flow, forwarding engine 620 forwards the frame based on a local forwarding table. In some embodiments, flow management module 630 divides bandwidth of the port into a plurality of logical partitions, as described in conjunction with FIG. 1B. Among the logical partitions, at least one logical partition is allocated for the software-defined data flow.

In some embodiments, switch 600 is capable of performing an integrated lookup, as described in conjunction with FIG. 3A, and includes an arbitration system 640. Under such a scenario, if the received frame belongs to the software-defined flow, forwarding engine 620 can process the frame based on the forwarding information in a forwarding table, a flow definition in a local flow table, or both. Forwarding information in the forwarding table can include layer-2 forwarding information and/or layer-3 routing and forwarding information. Arbitration system 640 applies an arbitration policy on the frame. In some embodiments, the arbitration policy is based on a priority associated with the software-defined data flow. The value of the priority dictates the order at which the switch uses the flow table, forwarding table, or both for processing the frame.

Furthermore, flow management module 630 can use the software-defined data flow for providing one or more of: access control, backup forwarding, policy based routing, network management; and service. The service includes one or more of: firewall, load balancing, network access control, intrusion detection/protection, network analysis, and network virtualization. In some embodiments, switch 630 includes an information management module 632, which facilitates polling for network state information of switch 600 to the controller of the software-defined network. The network state information includes one or more of: topology discovery information, traffic statistics, and link status information, as described in conjunction with FIG. 5. Furthermore, information management module 632 may be implemented in software, hardware, or a combination thereof. For example, information management module 632 can be implemented in a set of instructions stored in storage device 650, and when such instructions are executed by processor 651, cause processor 651 to perform a set of operations. Information management module 632 can also be implemented in hardware chips such as ASICS and FPGAs.

Note that the above-mentioned modules can be implemented in hardware as well as in software. In one embodiment, these modules can be embodied in computer-executable instructions stored in a memory which is coupled to one or more processors in switch 600. When executed, these instructions cause the processor(s) to perform the aforementioned functions.

In summary, embodiments of the present invention provide a switch and a method for using forwarding table, flow table, or both for forwarding traffic belonging to a software-defined flow. In one embodiment, the switch includes at least one port, a flow management module, and forwarding circuitry. The port is capable of receiving a frame belonging to a software-defined data flow and a frame belonging to a regular data flow. The flow management module logically partitions the port for the frame belonging to the software-defined data flow from the frame belonging to the regular data flow. The forwarding circuitry forwards the frame belonging to the software-defined data flow based on a flow definition in a local flow table. The flow definition indicates how the software-defined data flow is processed in a software-defined network.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A system, comprising:
a network of a plurality of hybrid switches, each hybrid switch of the plurality of hybrid switches configured to support a software-defined data flow and a regular data flow via a port partitioned into a first partition and a second partition, respectively, wherein an identifier included in a header of a frame received via the port determines whether the frame belongs to the software defined data flow or to the regular data flow; and
processing circuitry that manages the network, the processing circuitry configured to:
poll the plurality of hybrid switches to collect state information that indicates a state of the network;
apply a policy-based routing procedure to balance link loads based on a flow definition in a flow table, wherein the policy is based on a priority associated with the software-defined data flow so that a value of the priority dictates an order at which the hybrid switch uses the flow table; and
balance the link loads, based on the collected state information and the policy-based routing procedure, for software-defined data flows between hybrid switches in the network.

2. The system according to claim 1, wherein the processing circuitry is configured to poll a hybrid switch by sending a query message to the hybrid switch.

3. The system according to claim 1, wherein the network is an integrated heterogeneous software-defined network.

4. The system according to claim 1, wherein the state information includes topology information of a topology of the network.

5. The system according to claim 1, wherein the state information includes traffic statistics of the network.

6. The system according to claim 1, wherein the state information includes traffic statistics of a particular hybrid switch of the plurality of hybrid switches.

7. The system according to claim 1, wherein a hybrid switch is configured with simple network management protocol (SNMP) traps, and the processing circuitry is configured to poll a SNMP trap of the hybrid switch to collect state information.

8. The system according to claim 1, wherein the network is an OpenFlow-enabled network.

9. The system according to claim 1, wherein a hybrid switch of the plurality of hybrid switches is configured to send state information to the processing circuitry in response to receiving a polling request.

10. The system according to claim 1, wherein the processing circuitry is further configured to:
in response to the frame being allocated to the first partition, determine a first output port for the frame based on a flow definition in a local flow table and forward the frame via the first output port; and
in response to the frame being allocated to the second partition, determine a second output port for the frame based on a forwarding entry in a local forwarding table and forward the frame via the second output port.

11. A controller for managing a network, the controller comprising: processing circuitry configured to:
poll a plurality of hybrid switches in a network to collect state information that indicates a state of the network, each hybrid switch of the plurality of hybrid switches configured to support a software-defined data flow and a regular data flow via a port partitioned into a first partition and a second partition, respectively, wherein an identifier included in a header of a frame received via the port determines whether the frame belongs to the software defined data flow or to the regular data flow;
apply a policy-based routing procedure to balance link loads based on a flow definition in a flow table, wherein the policy is based on a priority associated with the software-defined data flow so that a value of the priority dictates an order at which the hybrid switch uses the flow table; and
balance the link loads, based on the collected state information and the policy-based routing procedure, for software-defined data flows between hybrid switches in the network.

12. The controller according to claim 11, wherein the processing circuitry is configured to poll a hybrid switch by sending a query message to the hybrid switch.

13. The controller according to claim 11, wherein the network is an integrated heterogeneous software-defined network.

14. The controller according to claim 11, wherein the state information includes topology information of a topology of the network.

15. The controller according to claim 11, wherein the state information includes traffic statistics of the network.

16. The controller according to claim 11, wherein the state information includes traffic statistics of a particular hybrid switch of the plurality of hybrid switches.

17. The controller according to claim 11, wherein the network is an OpenFlow-enabled network.

18. The controller according to claim 11, wherein the processing circuitry is further configured to:
in response to the frame being allocated to the first partition, determine a first output port for the frame based on a flow definition in a local flow table and forward the frame via the first output port; and
in response to the frame being allocated to the second partition, determine a second output port for the frame based on a forwarding entry in a local forwarding table and forward the frame via the second output port.

19. A method for managing a network, the method comprising:

polling a plurality of hybrid switches in a network to collect state information that indicates a state of the network, each hybrid switch of the plurality of hybrid switches configured to support a software-defined data flow and a regular data flow via a port partitioned into a first partition and a second partition, respectively, wherein an identifier included in a header of a frame received via the port determines whether the frame belongs to the software defined data flow or to the regular data flow;

applying a policy-based routing procedure to balance link loads based on a flow definition in a flow table, wherein the policy is based on a priority associated with the software-defined data flow so that a value of the priority dictates an order at which the hybrid switch uses the flow table; and balancing the link loads, based on the collected state information and the policy-based routing procedure, for software-defined data flows between hybrid switches in the network.

20. The method of claim 19, further comprising:

in response to the frame being allocated to the first partition, determining a first output port for the frame based on a flow definition in a local flow table and forward the frame via the first output port; and in response to the frame being allocated to the second partition, determining a second output port for the frame based on a forwarding entry in a local forwarding table and forward the frame via the second output port.

\* \* \* \* \*